(12) United States Patent
Harrison et al.

(10) Patent No.: US 10,378,856 B2
(45) Date of Patent: Aug. 13, 2019

(54) TARGETING ILLUMINATION UNIT

(71) Applicant: SWITCHBLADE ALLEY, INC., Seattle, WA (US)

(72) Inventors: Albert B. Harrison, Seattle, WA (US); Cheryl A. Pothoven, Edmonds, WA (US)

(73) Assignee: Switchblade Alley, Inc., Seattle, WA (US)

( * ) Notice: Subject to any disclaimer, the term of this patent is extended or adjusted under 35 U.S.C. 154(b) by 0 days.

(21) Appl. No.: 15/382,643

(22) Filed: Dec. 17, 2016

(65) Prior Publication Data

US 2017/0176140 A1    Jun. 22, 2017

Related U.S. Application Data

(60) Provisional application No. 62/268,662, filed on Dec. 17, 2015.

(51) Int. Cl.

| *F41G 1/34* | (2006.01) |
| *F41G 1/35* | (2006.01) |
| *G02B 27/34* | (2006.01) |
| *G02B 27/36* | (2006.01) |

(52) U.S. Cl.
CPC ............. *F41G 1/35* (2013.01); *G02B 27/34* (2013.01); *G02B 27/36* (2013.01)

(58) Field of Classification Search
CPC ...................... F41G 1/32–36; G02B 27/34–36
USPC .................................................. 362/110–114
See application file for complete search history.

(56) References Cited

U.S. PATENT DOCUMENTS

| 5,040,322 | A | 8/1991 | Iturrey, Jr. |
| 5,430,967 | A | 7/1995 | Woodman, III et al. |
| 6,526,688 | B1 | 3/2003 | Danielson et al. |
| 6,571,503 | B2 | 6/2003 | Thorpe |
| 6,574,901 | B1 | 6/2003 | Solinsky et al. |
| 7,360,333 | B2 | 4/2008 | Kim |
| 7,421,817 | B2 | 9/2008 | Larsson |
| 7,523,583 | B2 | 4/2009 | Cheng |
| 8,584,392 | B1 | 11/2013 | Young |
| 8,607,495 | B2 | 12/2013 | Moore et al. |
| 8,806,795 | B1 | 8/2014 | Kay |
| 8,844,189 | B2 | 9/2014 | Moore et al. |
| 8,944,626 | B2 | 2/2015 | Matthews et al. |
| 2008/0209789 | A1 | 9/2008 | Oz |
| 2011/0314720 | A1* | 12/2011 | Cheng ................ F41G 1/345 42/117 |

(Continued)

*Primary Examiner* — Jason M Han
(74) *Attorney, Agent, or Firm* — Charter IP LLC; Matthew J. Lattig

(57) ABSTRACT

A targeting illumination unit (100) adapted for attachment to a weapon (190) is described herein. The unit (100) include a hollow body (105), a non-laser light source (160) supported in the body and adapted to emit at least one light beam (175), and a lens assembly (120) supported in the body and adapted to focus the emitted at least one light beam (175) for projection therefrom, and a reticle (125) provided between the non-laser light source (160) and lens assembly (120). The reticle (125) has a geometrically-shaped image formed thereon that is adapted to modify the at least one light beam (175) emitted by the light source (160). The unit (100) is adapted to project a geometrically-shaped targeting light image (180) at a distance from the weapon (190) for facilitating targeting of the weapon (190).

20 Claims, 7 Drawing Sheets

(56) References Cited

U.S. PATENT DOCUMENTS

2013/0283661 A1* 10/2013 Lynn et al. ............... F41G 1/35
                                                        42/114

* cited by examiner

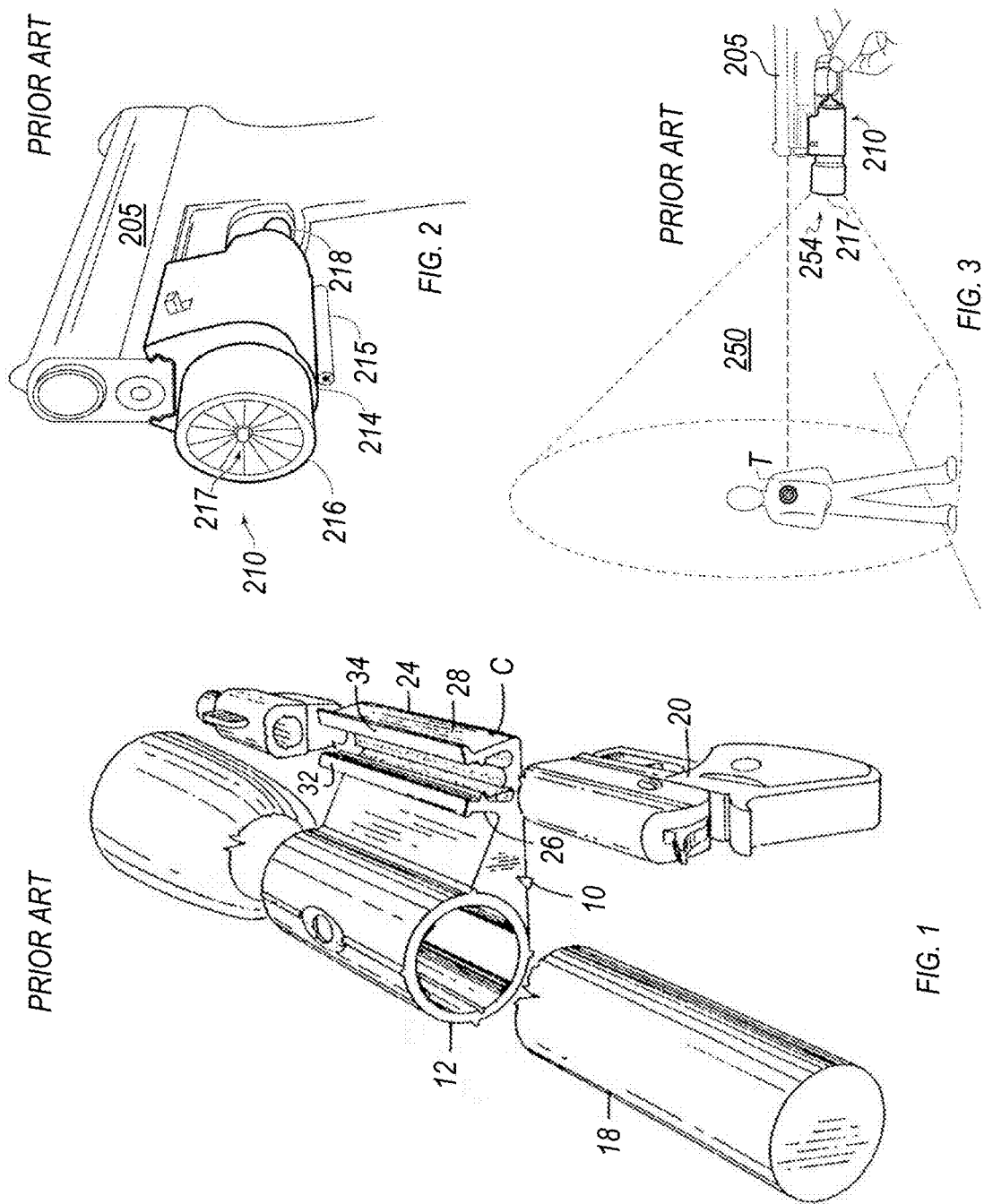

SECTION A-A

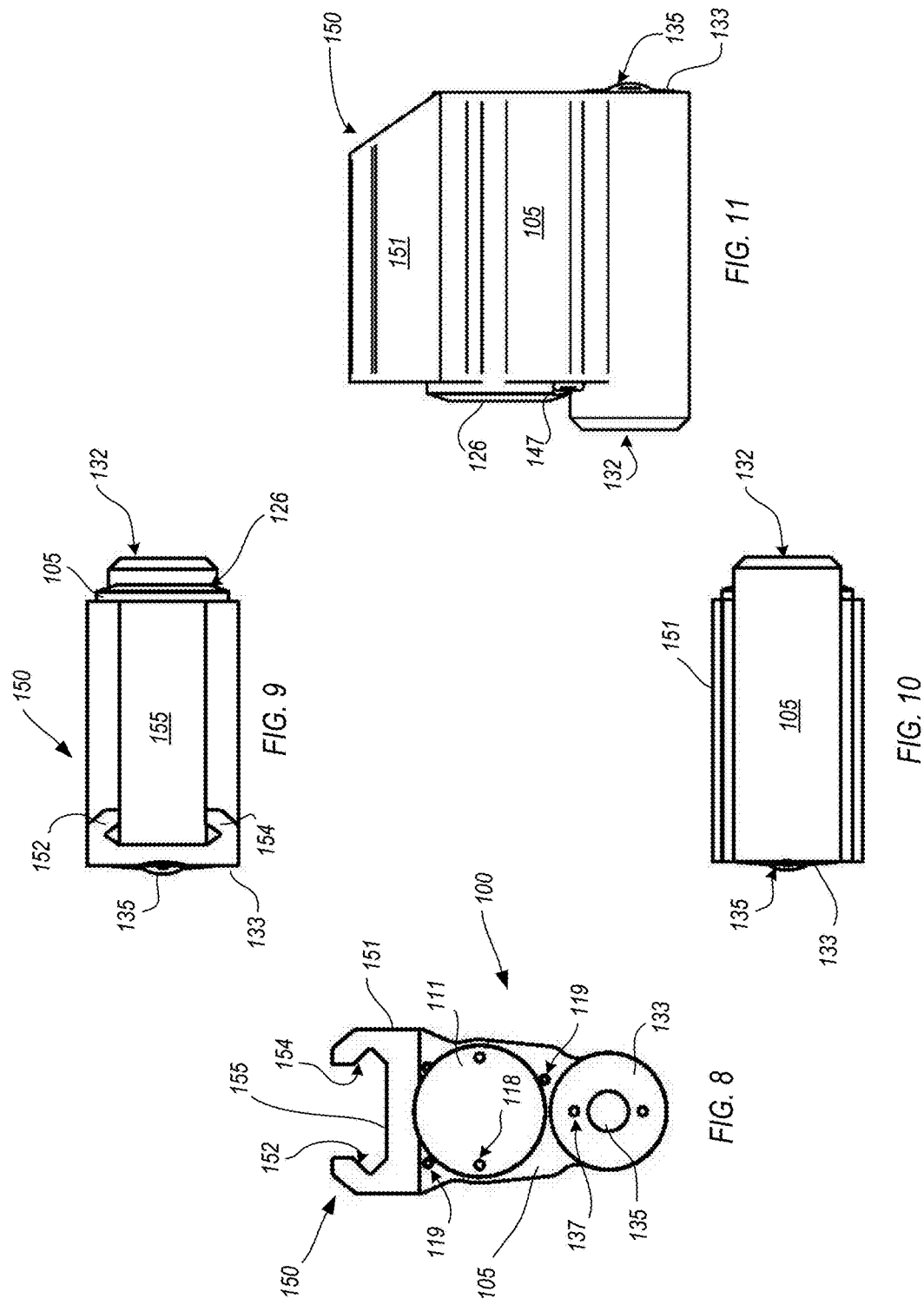

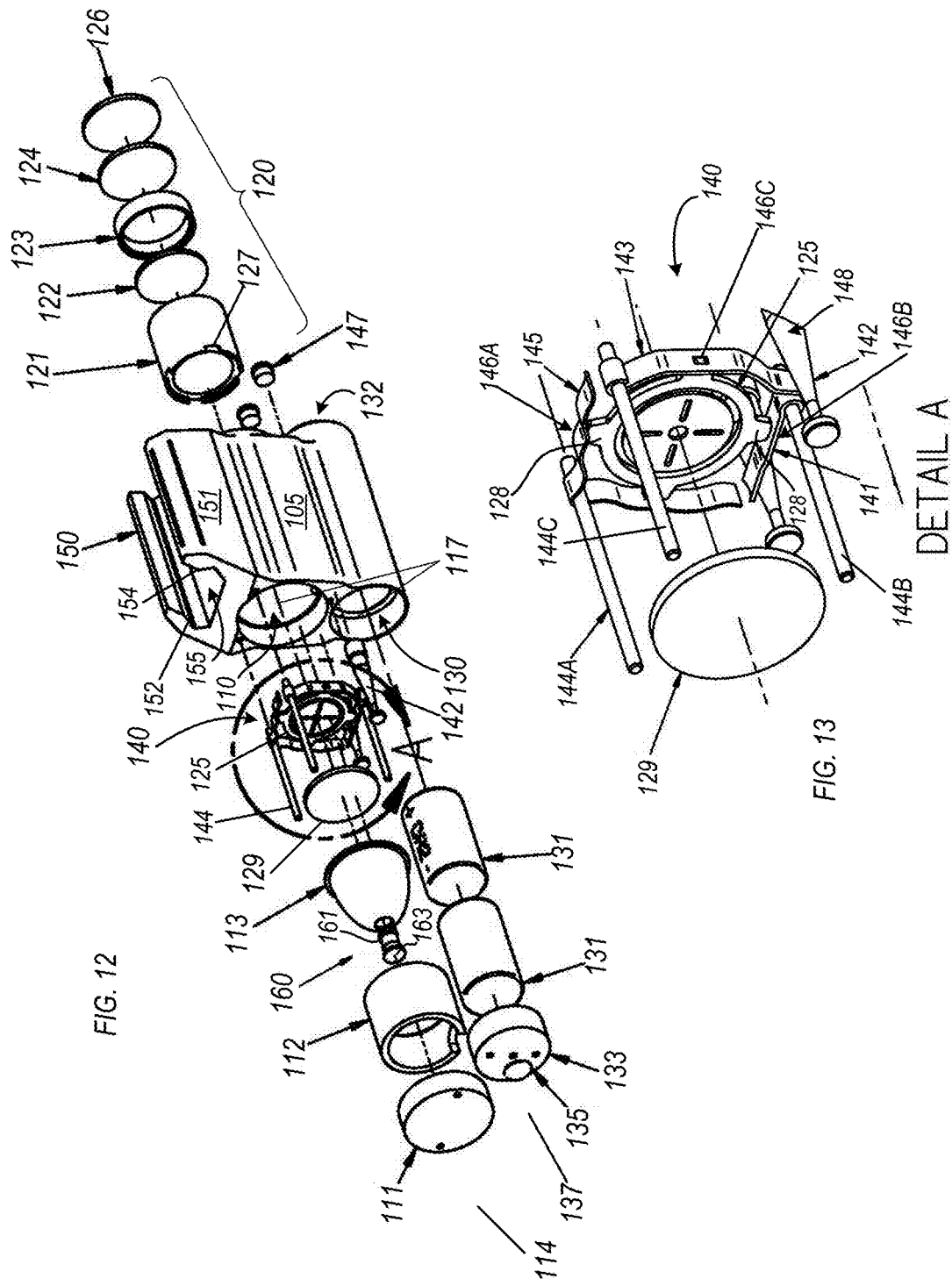

TARGETING ILLUMINATION UNIT

CROSS-REFERENCE TO RELATED APPLICATIONS

The present application claims the benefit under 35 U.S.C. § 119(e) of U.S. Provisional Patent Application Ser. No. 62/268,662 to Albert B. Harrison, filed Dec. 17, 2015. The entire contents of this provisional application is hereby incorporated by reference herein.

BACKGROUND

Field

The example embodiments in general are directed to a targeting illumination unit for a weapon such as a firearm or bow, a combination including the unit and weapon, and to an illumination unit adapted to be retrofitted to a conventional flashlight.

Related Art

For well over a hundred years, proposals have been made for assisting the aiming of firearms with light beams or light spots on targets. The development of laser diodes comparable in size and ruggedness to small incandescent light bulbs spawned additional advances, and advanced laser beam aim assistance systems have been developed for law enforcement and private citizens alike.

For example, FIG. 1 is a perspective view of a conventional night shooting aid for a firearm. The shooting aid includes a mounting device or structural member 10 configured to receive a flashlight 18 as well as a firearm 20. The structural device 10 includes a flashlight-engaging portion 12 along one edge, and a firearm-receiving member (clip C—see clip member 24) along the opposite edge, at a laterally removed location from the flashlight-engaging portion 12. The clip member 24 has upwardly extending, elongate sidewalls 26 and 28 that are closer together at the top than at the bottom, forming a clip member 24 whose sidewalls strongly resist separation. The uppermost edges 32 and 34 of the clip member 24 are rounded so as to readily receive a forward structural portion of the firearm 20. In this way the flashlight 18 and firearm 20 supported by the structural member 10 can be aimed in a common direction. Therefore, upon the clip sidewalls 26 and 28 being forced apart to receive a forward portion of a firearm 20 therein, they, upon release, tightly grip the firearm 20, and serve to direct the aim of the firearm 20 to a point of coincidence with the aim of the flashlight 18, generally in the range of 12 feet to 18 feet in front of the user.

Accordingly, a normal human response toward a potential threat is to want to see it as clearly as possible. Existing weapon mounted lights, which contain only narrow illumination beams, typically have the most intense portion of the light beam parallel with the weapon's barrel. This necessitates that the best lit area is also the general location that a bullet would strike if the weapon were discharged. In this light, a more recent conventional weapon-mounted light is described in FIGS. 2 and 3, which comprises a flashlight 210, mounted on, or adjacent to, the barrel 205 of a firearm/weapon, that has a broad beam of light 250 to illuminate at an angle to both sides of the target. The mounted flashlight 210 permits the light beam 250 to encompass adjacent areas, above/below and/or to both sides, to the line of the barrel 205 in which the target lies. The light 210 is mounted to the weapon via a rail, a trigger guard, or the like, and may be disposed along the bottom, the top, or sides of the barrel 205.

As shown, the weapon mounted light 210 is affixed to the weapon, which has a bore disposed along a targeting line T of the weapon. A bulb-reflector cap assembly 216 has at least one light source 217, and a reflector 254 conformed to direct the broad beam of light 250 generated by the at least one light source 217 in which the beam 250 generated encompasses a broad area outside of the line of the target T. The light 210 may be disposed along the bottom, the top, or to the side of the weapon G, as is well known in the art. A laser target sight 215 may be provided integrally attached to the weapon mounted light 212, or as an accessory thereto (not shown), as is well known in the art. Alternatively, a laser target sight 215 may be provided in the bulb-reflector assembly 216. A switch 218 is provided on a base 214 to actuate light 210 and/or the selectively actuate of the at least one light source 217.

While the above types of systems exhibit sound performance, they are typically rather expensive and therefore may be beyond the reach of many police departments or citizens. Moreover, none of these systems projects any kind of image which may assist the user in targeting; merely a light beam.

SUMMARY

An example embodiment of the present invention is directed to a targeting illumination unit adapted for attachment to a weapon to illuminate a target within a target zone. The targeting illumination unit includes a hollow body attached to the weapon, the body supporting a light source therein that is adapted to generate at least one light beam, and a lens assembly and power source therein that is configured to power the light source. The unit includes a reticle provided between the light source and lens assembly, the reticle having a geometrically-shaped image formed thereon that is adapted to modify the at least one light beam emitted by the light source. The at least one light beam is modified through the reticle and focused through the lens assembly to project a targeting light image to pinpoint, at a distance from the weapon, a specific spot in a target zone of interest which corresponds to where the weapon is to target, the targeting light image having a geometrically-shaped design visible in the target zone.

Another example embodiment is directed to a combination comprising a weapon and a target illumination unit removeably attached thereto. The unit includes a hollow body having an upper aperture and a lower aperture, the upper aperture containing a forward capture sleeve supporting a lens assembly therein and a rear capture sleeve supporting a light source therein that is adapted to generate at least one light beam. The unit further includes a reticle provided between the light source and lens assembly within the upper aperture, the reticle having a geometrically-shaped image formed thereon that is adapted to modify the at least one light beam emitted by the light source, and a power source supported within the lower aperture and configured to power the light source. The at least one light beam is modified through the reticle and focused through the lens assembly to project a targeting light image that is adapted to pinpoint, at a distance from the weapon, a specific spot in a target zone of interest which corresponds to where the weapon is to target at a distance from the weapon, the targeting light image having a geometrically-shaped design visible in the target zone.

Another example embodiment is directed to a targeting illumination unit adapted for attachment to a weapon. The unit includes a body, a non-laser light source supported in the body and adapted to emit at least one light beam, and a lens assembly supported in the body and adapted to focus the emitted at least one light beam for projection therefrom, and a reticle provided between the non-laser light source and lens assembly. The reticle has a geometrically-shaped image formed thereon that is adapted to modify the at least one light beam emitted by the light source. The unit is adapted to project a geometrically-shaped targeting light image at a distance from the weapon for facilitating targeting of the weapon.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

FIG. 1 is a perspective view of a conventional night shooting aid for a firearm.

FIG. 2 is a perspective view of another conventional weapon-mounted light.

FIG. 3 is a partial side view of the light in FIG. 2 illustrating the beam path on a target line T.

FIG. 8 is a rear plan view of the illumination unit shown in FIGS. 4 and 5.

FIG. 9 is a top plan view of the illumination unit shown in FIGS. 4 and 5.

FIG. 10 is a bottom plan view of the illumination unit shown in FIGS. 4 and 5.

FIG. 11 is a left-side elevational view of the illumination unit shown in FIGS. 4 and 5, the right-side view being a mirror image thereof.

FIG. 12 is an exploded parts view of the example unit.

FIG. 13 is an enlarged view of the detail "A" region in FIG. 12 to illustrate constituent components of the lever assembly in more detail.

DETAILED DESCRIPTION

Figure 4:
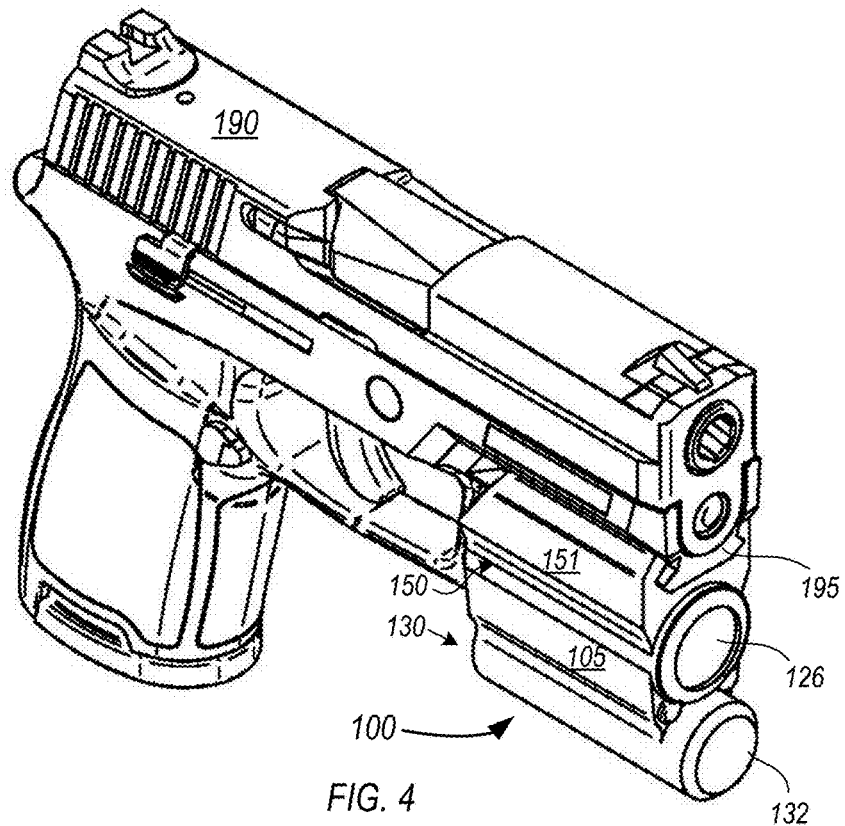
FIG. 4 is a perspective view of a targeting illumination unit for a weapon according to an example embodiment.
Figure 5:
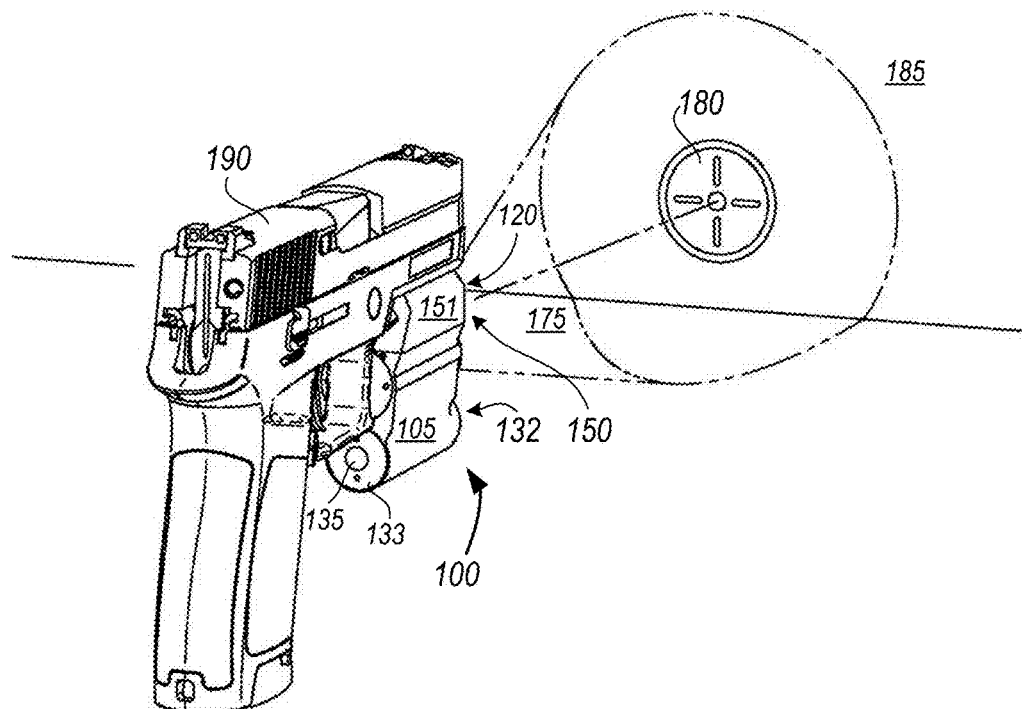
FIG. 5 is a perspective rear view of the unit to illustrate a light beam and targeting light image at distance.
Figure 6:
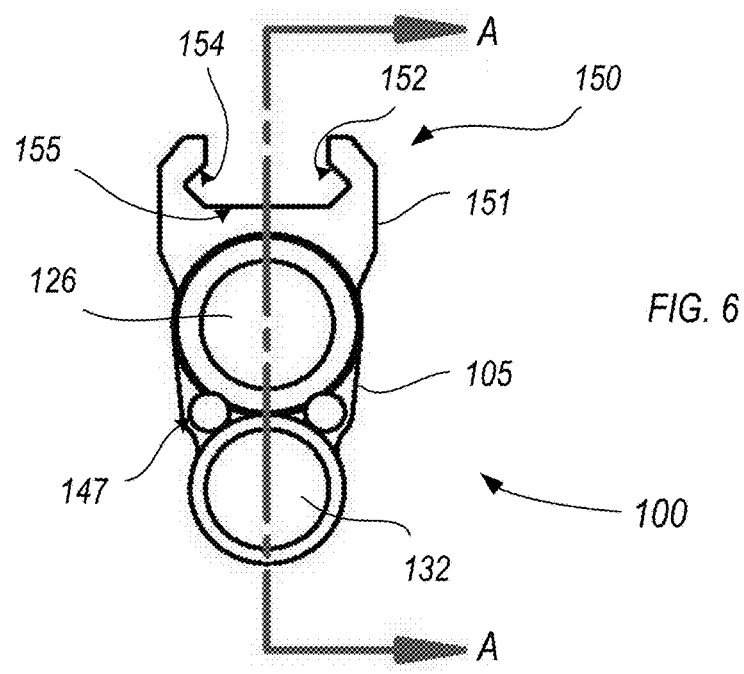
FIG. 6 is a front plan view of the illumination unit shown in FIGS. 4 and 5.
Figure 7:
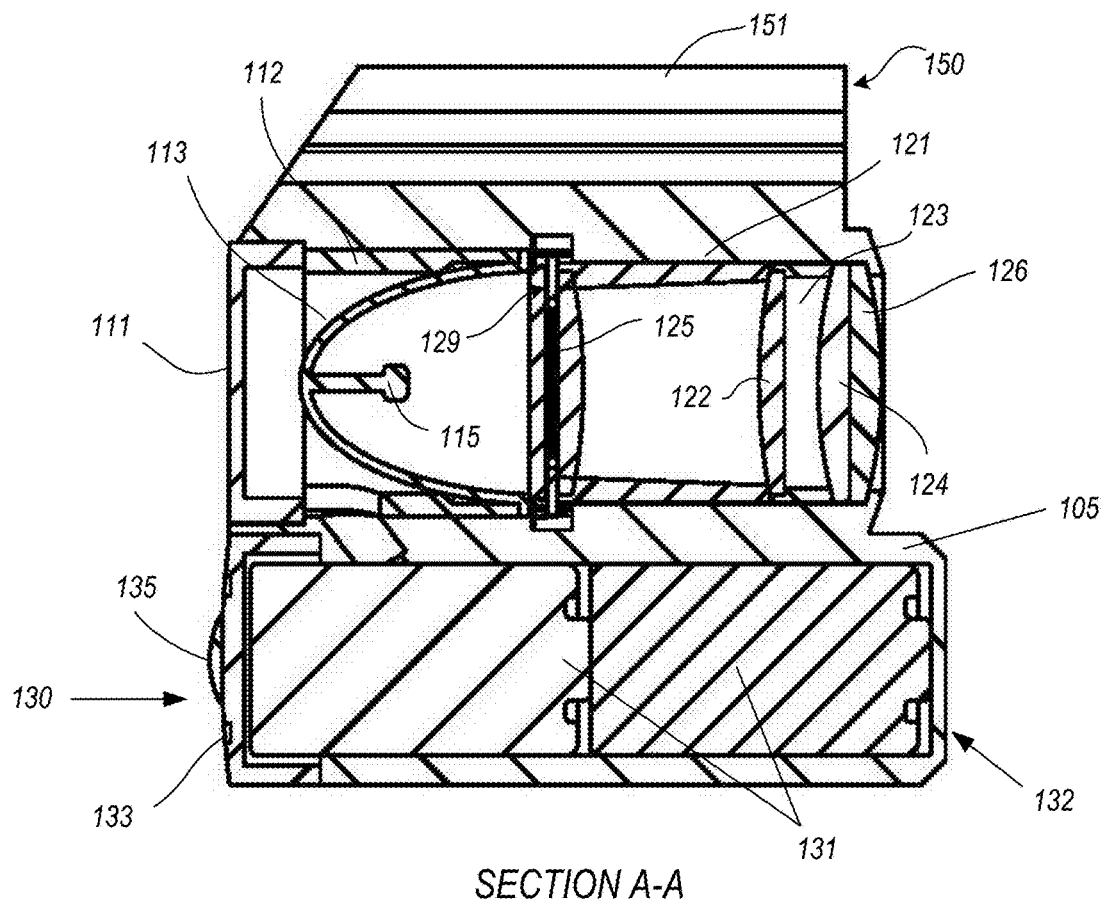
FIG. 7 is a cross-sectional view taken along line A-A of the targeting illumination unit front view of FIG. 6.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

The example embodiments hereafter describe a targeting illumination unit for a weapon such as a firearm or bow, a combination including the unit and weapon, and to an illumination unit adapted to be retrofitted to a conventional flashlight. Referring now to FIGS. 4-16, the inventor has contemplated a targeting illumination unit 100, (hereafter "unit 100") configured for use in conjunction with a weapon 190, and the combination therefor, which enables projected light from a light source 160 of the unit 100 as mounted on the weapon 190 to be oriented in the form of a targeting light image 180 on a potential target of interest, at a distance from a user of the weapon.

Although the example embodiments are described attached to a weapon 190 embodied as a hand gun, it is not limited to that embodiment. The example targeting illumination unit 100 may be used with a variety of hand-held or mounted weapons including rifles, shot guns, pistols, revolvers, machine guns, and the like. The unit 100 may be disposed along the bottom, the top, or to the side of the weapon 190, as is also well known in the art.

Unit 100 is comprised of a body 105 having an elongate, upper aperture 110 embodied as a hollow bore in body 105 for accommodating a lens assembly 120, a lever assembly 140 accounting for windage and elevation adjustments for unit 100, and a light source 160 therein. Unit 100 also includes a mount 150 configured to engage a mounting rail 195 on weapon 190 to secure the unit 100 thereto. The mounting rail 195 can be formed integrally with the weapon 190 or can be attached to weapon 190 by a clamp or other fastener. Generally, the mount 150 and the mounting rail 195 include the mating features of dovetail joints, such as the well-known, primary rail mounts such as the Weaver or Picatinny type. In an example, one, some or each of the light source 160, lens assembly 120, and lever assembly 140 may be modular and removable from the unit 100.

For example, and as best in FIGS. 8-12, in one aspect, the mounting rail 195 is provided to operably engage the mount 150 of unit 100, which in an example is a conventional dovetail receptor on unit 100. The mounting rail 195 has tapered sidewalls that extend along a longitudinal axis of the mounting rail 195 and spaced apart along an orthogonal transverse axis of the mounting rail 195 in positions for engaging mating sidewalls 152, 154 on the body 151 of the mount 150, such that the rail 195 is captured on the central planar surface 153 of the mount between the sidewalls 152, 154.

Unit 100 further includes an elongate, lower aperture 130 embodied as a hollow bore closed at a front end 132 and closeable at a rear end of unit 100 by a removable access cover 133 which secures a power source 131 therein. Cover 133 is fixedly attachable to body 105 via fasteners 137. An on/off switch 135 is provided on cover 133 to provide power to unit 100 via the power source 131 within lower aperture 130. The power source 131 is adapted to power the light source 160 so as to generate one or more high intensity light beams (indicated by element 175) through the lens assembly 120 of unit 100. In general, the high intensity light beams 175 generated by the light source 160 is modified within the lens assembly 120 so that a targeting light image 180 is projected through the lens assembly 120 onto a target of interest 185 (shown in FIG. 5 as a wall surface as an example) at a distance from the weapon 190.

As shown best in FIG. 12, within the upper aperture 110, internal components are bounded between and within a rear capture sleeve 112 and a front capture sleeve 121, with much of the lever assembly 140 sandwiched therebetween. At the rear end of unit 100, a removable access cover 111 is secured to the rear capture sleeve 112 by fasteners 114, removal of which allows access to the light source 160 within a parabolic reflector 113, the lever assembly 140 and the lens assembly 120.

The term "reflector 113" as used herein includes conventional reflectors and lenses using conventional light sources, but also encompasses newer lenses that utilize the total internal reflection and secondary optics which are available from Cree, Inc. of Durham, N.C., or other suppliers.

The term "light source 160" as used herein includes light emitters or other light source(s) as is well known in the art of flashlights. In one example, light source 160 is configured as a modular unit and may support a suitable bulb. In one example, the light source 160 may be embodied as any non-laser light source within the body 105 that is configured to project a targeting light image 180 facilitating targeting of the weapon 190. This may include but is not limited to LEDs, OLEDs, fluorescent such as compact fluorescent bulbs (CFLs), incandescent, halogen, tungsten, and the like. In another example, the high intensity light beams 175 may comprise at least two different color lights, and optionally the targeting image 180 produced may have a strobe effect. In one example, light source 160 be embodied as at least one (or more) LED bulb element 161 with its associated electronics on a PCB 163. In another specific example, the light source 160 may be embodied as a high-quality drop-in module LED torch bulb, which is a combination of a reflector, LED, heat sink and control circuit. One commercial product suitable for the example embodiments is the CREE® XM-L T6 1-Mode 1000 Lumen LED Drop-in Module Torch Bulb.

The skilled artisan would recognize that other light source combinations are feasible, including but not limited to a combination of one or more incandescent or fluorescent high intensity beams, strobe lights, and/or bulbs or jells with at least two or more color lights; all are alternatives of the present design. In a further example the at least one light source 160 may optionally be embodied as a high intensity light, a strobe effect, at least two different colored beams, or combinations thereof.

Further, different light colors may be generated by the light source 160. These different colors may behave differently under different illumination situations. Various light wavelengths may be desirable for different situations. For example, some wavelengths penetrate smoke more effectively than others, and LEDs designed to emit those wavelengths may be desirable. One or more LED light bulbs may be provided with different colors or the ability to change the colors of the light beams. Similarly, high intensity weapon-mounted lights are useful for blinding and disorienting a potential threat. Accordingly, the light source 160 may be configured so as to generate at least one high intensity beam 175, a strobe effect, at least two different colored beams, or combinations thereof.

In another variant, the projected targeting light image 180 may be produced as a result of a reflection of particular pattern of LED's or other light sources arranged in light source 160. Additionally, the light source 160 for unit 100 is contemplated in an alternative construction to further generate an abundance of light to illuminate additional area(s) around the projected image, and is configured to be able to focus the projected image. In a further example, the slide assembly 130 may be modular, and can be removed in a scenario where a user desires no image; thus unit 100 would emit only light beams 175. Moreover, unit 100 may include function buttons, switches, and other apparatuses to vary the intensity of the emitted light beams, e.g., "hi", "lo", "blink", etc. An on/off switch (not shown) on the light source 160 electrically connects it to the power source 131.

Figure 14:
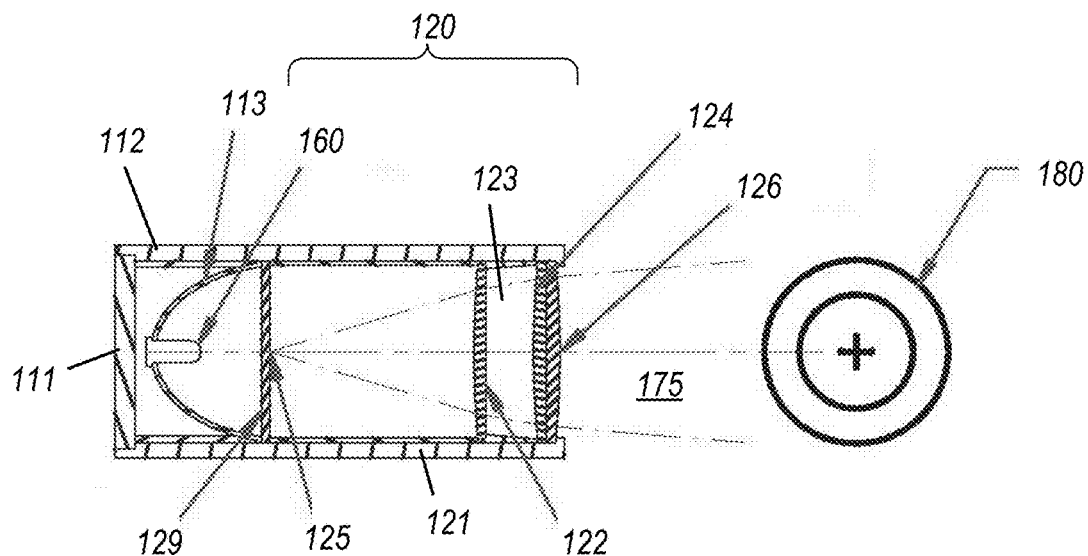
FIG. 14 is a cross-sectional view of a portion of the unit to illustrate a lens assembly in more detail in an example embodiment.
Figure 15:
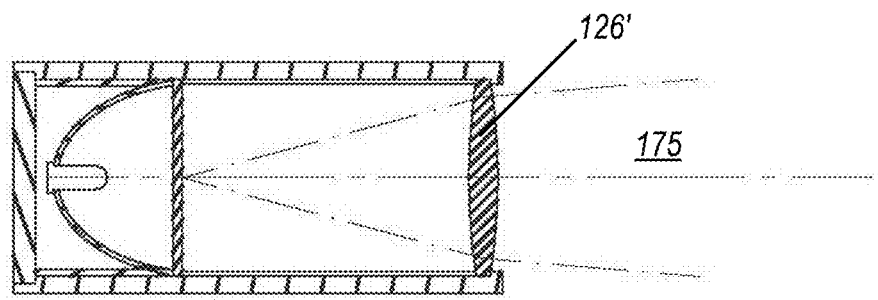
FIG. 15 is a cross-sectional view of a portion of the unit to illustrate a lens assembly according to another example embodiment.
Figure 16:
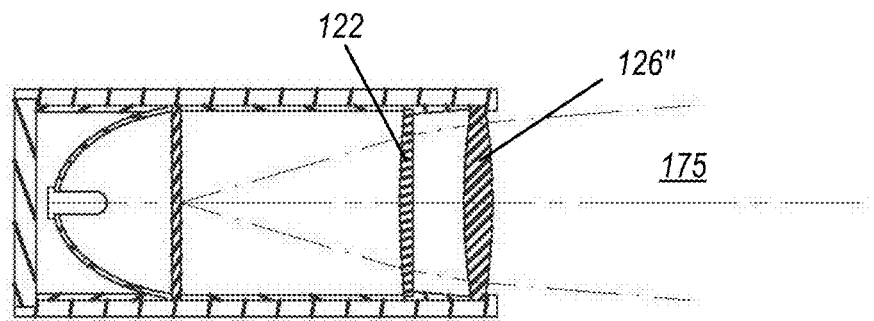
FIG. 16 is a cross-sectional view of a portion of the unit to illustrate a lens assembly according to another example embodiment.

FIGS. 14-16 demonstrate various configurations of the design of the lens assembly 120. The beam of light 175 is directed along the barrel of weapon 190 to illuminate a target zone, shown best in FIG. 5 by the targeting light image 180, and also illuminates some of the area 183 adjacent the target zone.

Referring to FIGS. 12 and 14-16, the lens assembly 120 includes a reticle 125 protected by a reticle cover 129 (which may be a glass disk), the reticle 125 attachable to the rear end of front capture sleeve 121 Namely, reticle 125 includes tabs 128 which are captured in slots 127 formed in the rear of front capture sleeve 121 to secure reticle 125 thereto. Lens assembly 120 further includes a condenser lens 122, lens spacer 123, and in one example embodiment (as best shown in any of FIGS. 7, 12 and 14), a pair of mirror-image facing plano-convex lenses (first focusing lens 124 and second focusing lens 126). FIGS. 15 and 16 show two other, different lens configuration designs for lens assembly 120.

The parabolic reflector 113 is a reflective surface used to collect the light energy emitted by light source 160. Its shape is part of a circular paraboloid, that is, the surface generated by a parabola revolving around its axis. As known, the parabolic reflector 113 transforms the incoming plane wave of light energy emitted by light source 160 traveling along the axis into a spherical wave converging toward the focus.

The reticle 125 receives the transformed light energy from the reflector 113. The reticle 125 is a series of cross lines that provides the image design (here for example purposes only shown as a crosshair design) in the targeting light image 180 that is projected onto a target of interest at a distance from unit 100 and weapon 190. In an example, reticle 125 may be embodied as any of a removable static image or removable film slide; thus it may be changed, removed or replaced. The targeting light image 180 to be projected is printed on a suitable material; reticle 125 in one example may be composed of acetate and/or like materials.

In operation, the light beam(s) 175 emitted from light source 160 is transformed through reflector 113, modified through reticle 125, and then focused through the condenser lens 122, first focusing lens 124 and second focusing lens 126 of lens assembly 120. The resulting light exiting the lens assembly 120 in the upper aperture 110 of unit 100 is thus projected as a geometrically-shaped targeting light image 180 at a target of interest, at a distance from the weapon 190.

The projected targeting light image 180 comprises a geometrically-shaped design visible within the projected light beam 175 that is adapted to pinpoint a specific spot in the target zone corresponding to where the weapon 190 is to target. This geometrically-shaped image may be configured as any shape, including but not limited to, that of a circle, square, trapezoid, triangle, rectangle, polygon with five (5) or more sides, rhombus, cross or crosshair pattern, "X", half circle, rounded or angular brackets, oval, any pattern consisting of one or more dots, any pattern consisting of one or more lines, and the like. Any one of these designs for targeting light image 180 may be incorporated into reticle 125 as desired.

In a variant, the targeting light image 180 may be configured in human form or silhouette. In another example, the projected image may be a silhouette or shadow derived by blocking some of the beam(s) generated by the light source 160; such could be done by modifying or changing out reticle 125 for example.

In a further example, light source 160 may be configured such that the projected image has apparent movement or is animated (i.e., big circle, intermediate circle, small circle) as a result of turning on and off of individual LED's in relationship to the pattern of LED's with in unit 100. The apparent movement or animation may be created via an algorithm stored on a software storage device contained in or external to unit 100. Moreover in a further example, the projected image may be derived from an internal video screen, to optionally have movement or be animated. Similarly, such may be stored on a software storage device, enabling the image to be reprogrammed or updated.

Referring again to FIGS. 12 and 13, unit 100 may be adjusted by a user to account for changes in windage and elevation. This is accomplished by the inclusion of the lever assembly 140. Assembly 140 includes an elevation adjustment lever 141 which is attached via a tapered adjustment screw 142 to a corresponding plug adjustment screw 147 accessible of the front of body 105 and operable by the user to adjust for elevation. Similarly, assembly 140 includes a windage adjustment lever 143 which is attached via another tapered adjustment screw 142 to a corresponding plug adjustment screw 147 operable by the user to adjust for the effects of wind on unit 100. A centering spring 145 is included to support the reticle 125 in the vertical direction, with the other levers 141, 143 providing horizontal stability to reticle 125, as best shown in FIG. 13. Centering spring 145 is partially supported by elongate retaining pin 144A; as further explained below, the elevation lever 141 is adapted to pivot about an elongate retaining pin 144B at one end thereof, and windage lever 143 is adapted to pivot about its elongate retaining pin 144C at an upper end thereof. These elongate retaining pins 144A-C support the assembly 140 within the upper aperture 110 between the sleeves 112, 121. Pins 144A-C are captured within bores 117 formed in the upper aperture 110.

The movement of reticle 125 is constrained by the reticle cover 129 and the front capture sleeve 121. As previously noted, slots 127 formed in the front capture sleeve 121 allow the tabs 128 in the reticle 125 to protrude past the cylindrical face at the rear end of the front capture sleeve 121. The reticle 125 is allowed to move vertically and laterally between the reticle cover 129 and the front capture sleeve 121.

The centering spring 145 is held in place by its retaining pin 144A. Slots 146A in this spring 145 engage tips of the tabs 128 of reticle 125. The elevation lever 141 and windage lever 143 also contain slots 146B and 146C which accept or abut a portion of a tab 128 of reticle 125, as shown. The windage lever 143 is mounted vertically, and pivots about retaining pin 144C at its top. At its bottom, the windage lever 144 rests against a corresponding tapered adjustment screw 142. As the plug adjustment screw 147 is turned clockwise by the user, the tapered screw 142 moves longitudinally within the upper aperture so that it deflects a bottom edge of the windage lever 143 laterally towards the reticle, the windage lever 143 pivoting about its retaining pin 144C at the slot 146C to tab 128 interface to move the reticle 125 laterally. As the reticle 125 is engaged with the windage lever 143, the lateral movement of its slot 146C in the windage lever 143 causes the reticle 125 to move laterally. This movement will further compress the centering spring 145. Turning plug adjustment screw 147 the opposite direction will release the pressure of the slot 146C on reticle 125, allowing spring pressure from centering spring 145 to move the reticle 125 laterally back toward its previous position.

Operation of the elevation lever 141 to adjust unit 100 for elevation is similar but slightly different. The elevation lever 141 is mounted horizontally, and pivots about its retaining pin 144B at its top. One end of the elevation lever 141 rests upon its corresponding tapered adjustment screw 142. As its corresponding adjustment screw 147 is turned clockwise by the user, the tapered adjustment screw 142 moves longitudinally within the upper aperture 110. This causes the conical portion 148 of the screw 142 to slide along the underside of elevation lever 141, which deflects the underside of the elevation lever 141 upwards towards the center of the device, towards reticle 125. As this occurs, the elevation lever 141 pivots at the slot 146B/tab 128 interface about its retaining pin 144B. As the reticle 125 is engaged with the elevation lever 141, the upward movement of central slot 146B therein causes the reticle 125 to move vertically. Turning adjustment screw 147 the opposite direction will cause the tapered screw to move longitudinally in the other direction so as to release the pressure of slot 146B on the tab 148 of reticle 125, allowing spring pressure from centering spring 145 to move the reticle 125 vertically back toward its previous position.

Within the lower aperture 130 in body 105, the power source in one example is embodied as one or more batteries 131 secured within lower aperture 130 between front end 132 and access cover 133. Power to unit 100 via its batteries 131 may be initiated or secured by simple actuation of the on/off switch 135. Batteries 131 may be embodied as one or more alkaline, non-rechargeable lead acid, lithium-ion (Li-ion), NiCd, NiMH or rechargeable batteries. In a specific example, batteries 131 may be embodied as CR2 lithium 3V batteries. In the event rechargeable batteries are employed, unit 100 may be configured to include an internal charger thereon. The rechargeable batteries may be embodied as a battery pack composed of any of lead acid (and its variants AGM, Flooded, and GEL cell), NiCd, NiMH or lithium ion (Li-ion) battery cells. Optionally, batteries 131 may be solar cells that could be solar-powered, charged by ambient light or by a combination of a rechargeable battery with solar cells to charge the battery. In a further alternative, the solar cells could be adapted to charge a super capacitor (at least about 1 F), with the super capacitor providing power to the light source 160.

Although the example embodiments are described attached to a weapon 190 such as a hand gun, the example embodiments may be used with a variety of hand-held or mounted weapons 190 including, but not limited to, rifles, shot guns, pistols, revolvers, machine guns, compound bows, crossbows, BB guns, pellet guns, dart guns, blow guns, non-operational or replica weapons, weapon-like toys, and the like. As to be described in an alternative example embodiment hereafter, the unit 100 may be modified as a kit so as to retrofit to an existing conventional flashlight.

In one example, the body 105 and other constituent structural parts of unit 100 such as sleeves 112, 121, access covers 111, 133 and mount 150 may be constructed primarily from lightweight moldable plastic materials such as moldable plastic, e.g., as a single or multiple parts formed by an injection molding process using a high impact plastic such as Acrylonitrile Butadiene Styrene (ABS). ABS is an easily machined, tough, low cost rigid thermoplastic material with high impact strength, and may be a desirable material for turning, drilling, milling, sawing, die-cutting, shearing, etc. Virgin ABS may be mixed with a plastic regrind of ABS or another lightweight, durable plastic material. ABS is merely an example material, equivalent materials may include various thermoplastic and thermoset materials, such as talc-filled polypropylene, high strength polycarbonates such as GE Lexan®, or blended plastics. There are many known injection molding machines for forming plastic injection molds, other plastic molding processes such as vacuum forming may be used.

In another example, body 105 and other constituent parts of unit 100 may be formed of a metal such as steel, Al and/or alloys of steel or aluminum using various know metalworking processes. These processes include but are not limited to CNC machining, sand casting, permanent mold casting, die casting, investment casting, ablation casting, closed-die forging, by extrusion, by cold heading, by stamping & deep drawing, via a screw machine, and through powder metallurgy, for example.

The pins 144A-C and fasteners 114, 137 may be formed of a suitable high-impact plastic or metal as described above, of another injection-molded polycarbonate, or of another material such as optical glass, artificial sapphire, etc. The upper and lower apertures 110, 130 may be embodied as an injection-molded elastomeric material such as ABS, composed of any of a rubber, urethane or like material, one example being silicon, and/or as a silicon or elastomeric-type material with or without UV inhibitors, combinations of these materials, etc.

Figure 17:
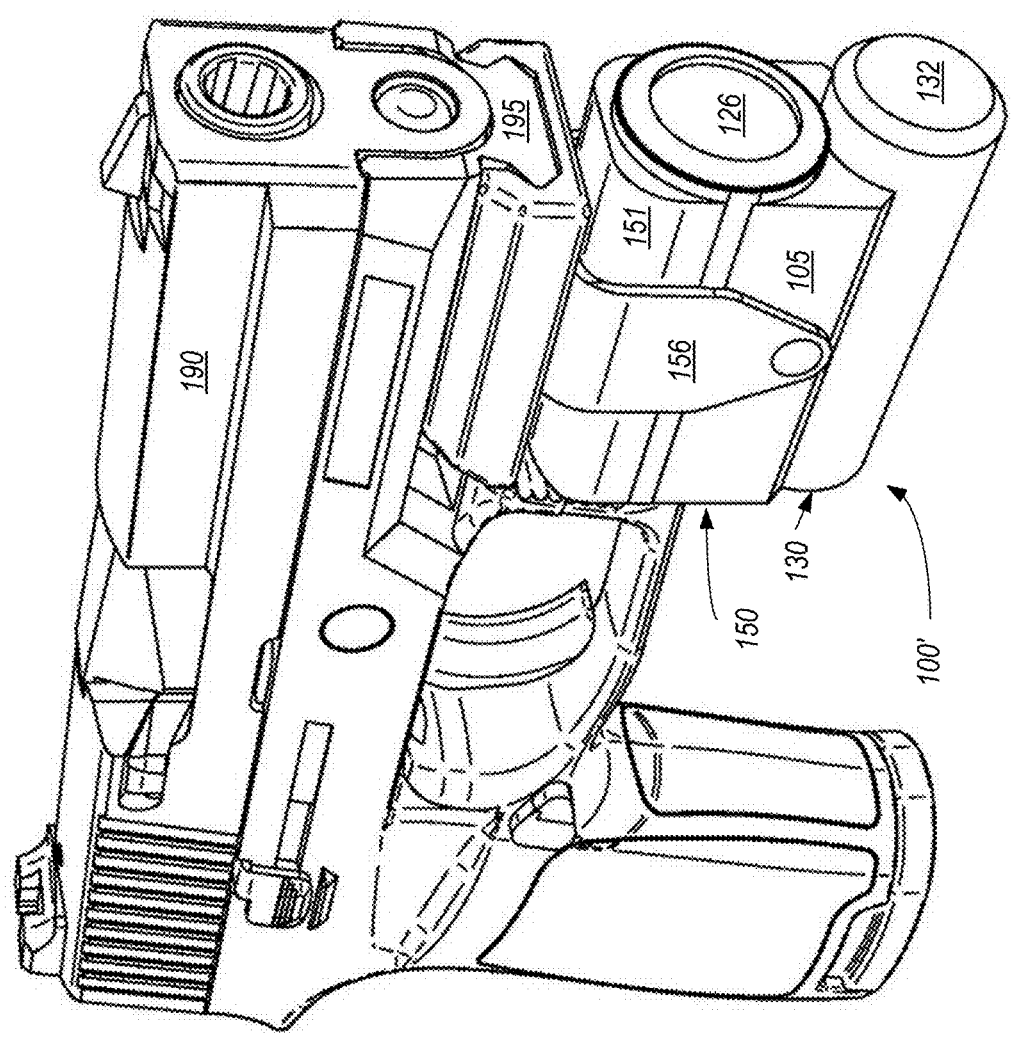
FIG. 17 is a perspective view of a targeting illumination unit for a weapon according to another example embodiment.

FIG. 17 is a perspective view of a targeting illumination unit for a weapon according to another example embodiment. The targeting illumination unit 100' is similar in many respects to unit 100; thus only the differences are discussed in detail. In this embodiment, there is no lever assembly 140. Rather, the unit 100' includes a trunnion 156 attached between mount 150 and rail 195.

The trunnion 156 allows for windage and elevation adjustments to the unit 100', in lieu of employing the lever assembly 140. For example, the trunnion 156 is attached to the rail 195 on weapon 190 using an upper pivot pin (shown generally by element 157 obscured). The axis of this pin 157 is vertical. By rotating the target illumination unit 100' on the pin 157, the aim point will move left and right on the target surface. This allows the user to horizontally align the aim point of the unit 100' with the firing point of the weapon 190. After alignment is achieved, the vertical axis of the trunnion mount 156 is locked into position by means of a brake (not shown).

Unit 100' is attached to the lower pivot of the trunnion 156 by a horizontal pivot pin 158. By rotating the unit 100' on the pivot pin 158, the aim point will move vertically on the target surface. This allows the user to vertically align the aim point of the targeting illumination unit 100' with the firing point of the weapon 190. After alignment is achieved, the horizontal axis of the trunnion 156 is locked into position by the brake.

Although two example mechanisms have been described as the above internal and external means to adjust for changes in wind conditions and for adjusting elevation of units 100/100', other solutions are foreseeable, such as a combination of internal and external components that provides for windage and elevation adjustments.

The example embodiments having been described, it is apparent that such have many varied applications. For example, the example embodiments may be applicable but not limited to connection to various devices, structures and articles. The present invention, in its various embodiments, configurations, and aspects, includes components, systems and/or apparatuses substantially as depicted and described herein, including various embodiments, sub-combinations, and subsets thereof. Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

We claim:

1. A targeting illumination unit adapted for attachment to a weapon to illuminate a target within a target zone, comprising:

a hollow body attached to the weapon but not to any scope that may be attached to the weapon, the hollow body supporting a light source therein that is adapted to generate at least one light beam that is transmitted through the hollow body at a distance from the weapon but not through any scope that may be attached to the weapon so that the targeting illumination unit does not interfere with use of the scope, the hollow body further supporting a lens assembly and power source therein that is configured to power the light source, and a reticle provided between the light source and lens assembly, the reticle having a geometrically-shaped image formed thereon that is adapted to modify the at least one light beam emitted by the light source, wherein the at least one light beam is modified through the reticle and focused through the lens assembly to project a targeting light image to pinpoint, at a distance from the weapon, a specific spot in a target zone of interest which corresponds to where the weapon is to target, the targeting light image having a geometrically-shaped design visible in the target zone.

2. The targeting illumination unit of claim 1, wherein the lens assembly includes a condenser lens in spaced relation to a pair of plano-convex lenses abutting one another in mirror-image relation to one another so that the convex side of one lens is oriented rearward toward the condenser lens and the convex side of the other lens is oriented toward the front of unit at the target zone.

3. The targeting illumination unit of claim 1, further comprising a mount for connecting the body of the unit to the weapon.

4. The targeting illumination unit of claim 1, wherein the hollow body further includes an upper aperture containing a forward capture sleeve supporting the lens assembly therein and a rear capture sleeve supporting the light source therein.

5. The targeting illumination unit of claim 4, further comprising:
a lever assembly attached to the reticle and arranged within the upper aperture between the forward and rear capture sleeves, the lever assembly adapted to adjust the position of the reticle laterally to account for wind conditions and vertically to change elevation of the unit.

6. The targeting illumination unit of claim 5, wherein the lever assembly further includes a windage lever in contact with a portion of the reticle and adapted to adjust the reticle laterally to account for changing wind conditions.

7. The targeting illumination unit of claim 5, wherein the lever assembly further includes an elevation lever in contact with a portion of the reticle and adapted to adjust the reticle vertically to change elevation.

8. The targeting illumination unit of claim 1, wherein the at least one light beam projected from the unit additionally is adapted to illuminate some of the area adjacent the target zone, in addition to the geometrically-shaped design of the targeting light image on a specific spot within the target zone.

9. The targeting illumination unit of claim 5, wherein one or more of the lens assembly, lever assembly, and light source are modular and removable from the unit.

10. The targeting illumination unit of claim 1, wherein the light source is embodied as a non-laser light source selected from a group comprising at least LEDs, OLEDs, fluorescent bulbs such as compact fluorescent bulbs (CFLs), incandescent, halogen, and tungsten bulbs.

11. The targeting illumination unit of claim 1, wherein the light source is adapted to emit at least two different colored light beams.

12. The targeting illumination unit of claim 1, wherein the light source is adapted to provide a strobe effect in the emitted at least one light beam.

13. The targeting illumination unit of claim 1, wherein the light source is embodied as a high-quality, drop-in module LED torch bulb.

14. The targeting illumination unit of claim 1, wherein the hollow body further includes a lower aperture supporting the power source therein.

15. The targeting illumination unit of claim 1, wherein the power source is embodied as one or more alkaline non-rechargable lithium-ion, NiCd or NiMH battery cells, or one or more rechargeable batteries.

16. A combination, comprising:
a weapon, and
a targeting illumination unit removably attachable to the weapon but not to any scope that may be attached to the weapon, the targeting illumination unit including:
a hollow body having a upper aperture and a lower aperture, the upper aperture containing a forward capture sleeve supporting a lens assembly therein and a rear capture sleeve supporting a light source therein that is adapted to generate at least one light beam that is transmitted through the hollow body at a distance from the weapon but not through any scope that may be attached to the weapon so that the targeting illumination unit does not interfere with use of the scope,
a reticle provided between the light source and lens assembly within the upper aperture, the reticle having a geometrically-shaped image formed thereon that is adapted to modify the at least one light beam emitted by the light source, and
a power source supported within the lower aperture and configured to power the light source,
wherein the at least one light beam is modified through the reticle and focused through the lens assembly to project a targeting light image that is adapted to pinpoint, at a distance from the weapon, a specific spot in a target zone of interest which corresponds to where the weapon is to target at a distance from the weapon, the targeting light image having a geometrically-shaped design visible in the target zone.

17. The combination of claim 16, wherein the weapon is selected from a group comprising at least hand guns, rifles, shot guns, pistols, revolvers, machine guns, BB guns, pellet guns, non-operational replica weapons, weapon-like toys, compound bows, and crossbows.

18. A weapon-mountable flashlight, capable of projecting an image at a distance therefrom, comprising:
a body containing a power source, light source powered by the power source, a reticle, and a lens assembly, the light source within the body directly adjacent to the reticle which in turn is directly adjacent to the lens assembly within the body,
wherein the body attaches to a rail or other surface of a weapon so as to not interfere with use of a scope, should a scope be present on the weapon.

19. The flashlight of claim 18, wherein the reticle is removable and replaceable.

20. The flashlight of claim 18, wherein
with the flashlight attached to the weapon and powered, the light source produces at least one light beam modified through the reticle and focused through the lens assembly to project a targeting light image,
the flashlight allowing for windage and elevation adjustment of the targeting light image relative to a barrel of the weapon,
the flashlight further able to be sighted in without firing the weapon by matching the targeting light image on a target via fixed sights integral to the weapon.

* * * * *